United States Patent [19]

Pierce

[11] Patent Number: 5,079,405
[45] Date of Patent: Jan. 7, 1992

[54] ELECTRODE OSCILLATING MECHANISM FOR WELDING ELECTRODE HOLDER

[75] Inventor: Ralph Pierce, Hermitage, Pa.

[73] Assignee: Charles W. Pierce, Marathon, Fla.; a part interest

[21] Appl. No.: 619,466

[22] Filed: Nov. 29, 1990

[51] Int. Cl.⁵ .............................................. B23K 9/022
[52] U.S. Cl. ...................................... 219/138; 219/136
[58] Field of Search ................... 219/136, 138; 128/36

[56] References Cited

U.S. PATENT DOCUMENTS

| | | | |
|---|---|---|---|
| 1,984,809 | 12/1934 | Re Qua | 219/136 |
| 2,405,761 | 8/1946 | Simmie | 219/136 |
| 2,572,084 | 10/1951 | Wilson | 219/136 |
| 3,623,481 | 11/1971 | Curran | 128/36 |
| 3,662,148 | 5/1972 | Blosser et al. | 219/136 |
| 4,614,857 | 9/1986 | Webb et al. | 219/136 |
| 4,697,580 | 10/1987 | Terauchi | 128/36 |

*Primary Examiner*—Clifford C. Shaw
*Attorney, Agent, or Firm*—Peter L. Klempay

[57] ABSTRACT

A small, fractional horsepower, low voltage electric motor with an eccentric weight on its output shaft is attached to the electrode clamp of a hand held welding electrode holder. The oscillating or orbiting motion generated by rotation of the eccentric weight is transmitted through the electrode clamp to the welding rod. Higher quality welds and reduced sticking and burn through result.

5 Claims, 2 Drawing Sheets

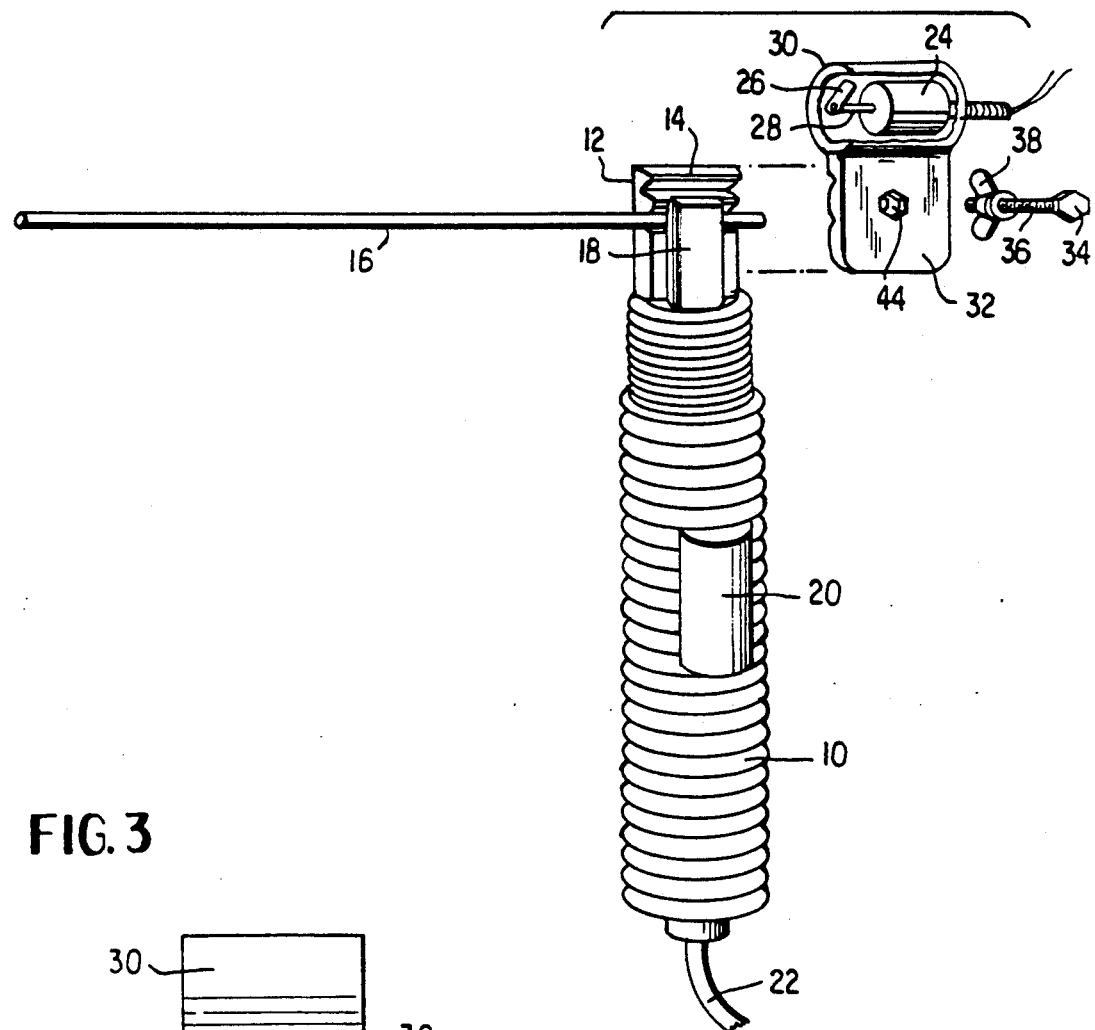
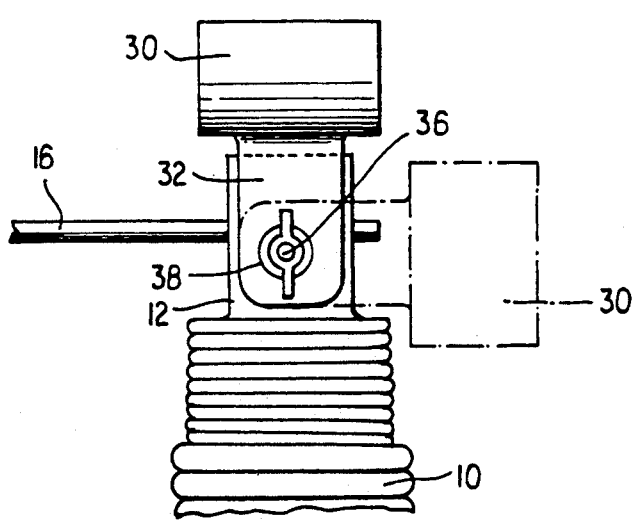
FIG. 3

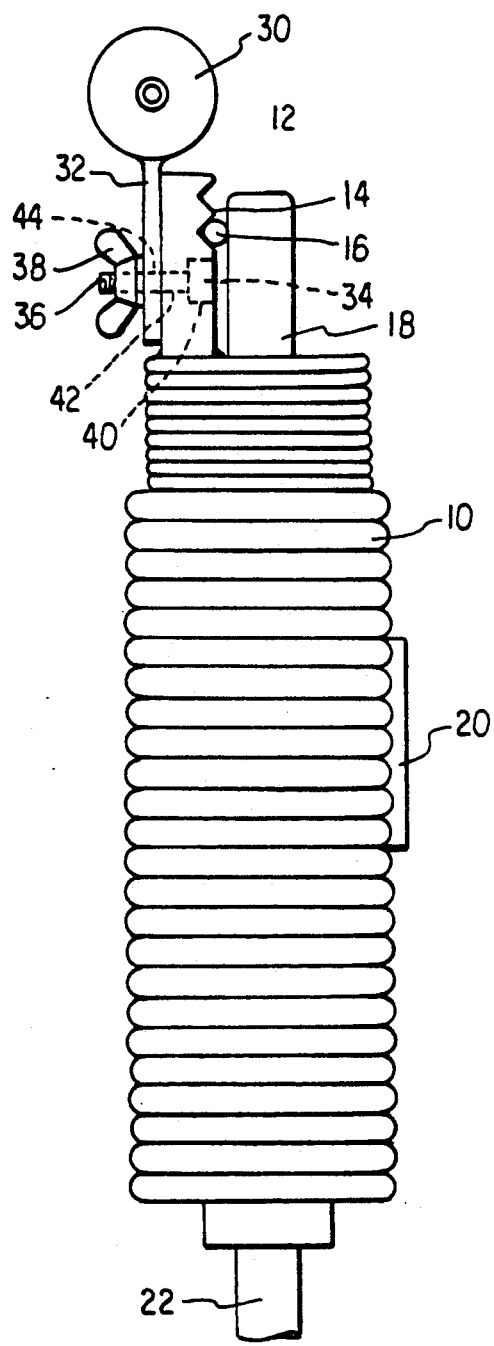
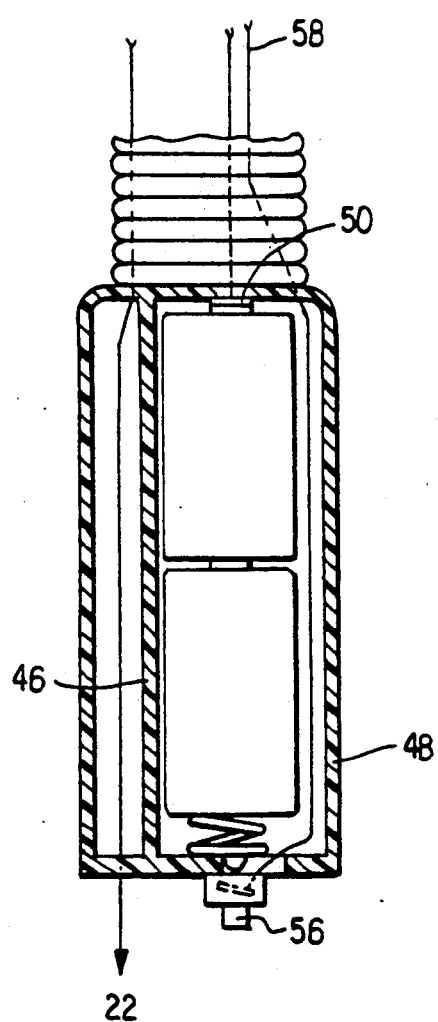
FIG. 2
FIG. 4

ELECTRODE OSCILLATING MECHANISM FOR WELDING ELECTRODE HOLDER

The present invention pertains to electrode holders of the type used in manual) arc welding.

BACKGROUND AND SUMMARY OF THE INVENTION

Electrode holders used in manual arc welding consist of a clamping mechanism for engaging one end of the welding electrode, a conductive body portion connecting the electrode to the welding power supply, and an insulated grip portion encircling the conductive body portion. In welding, the user manipulates the holder to bring the tip of the electrode into contact with the work, which is connected to the power supply, to establish an arc between the workpiece and the electrode, the arc serving to heat the workpiece to welding temperature and to melt the metallic tip of the electrode providing a bead of weld metal. The quanity of the resultant weld is dependent, in large part, on the skill of the operator in controlling the position and movement of the electrode.

I have discovered that the quality of welds formed by manual arc welding processes are improved by imparting low amplitude orbital motion to the welding rod. Preferably, this is accomplished by use of a small, battery powered electric motor rotating an eccentric weight and attached to the el elctrode clamp of the electrode holder. The attachment of the motor and eccentric weight to the clamp may include provision for adjustment of the orientation of the motor relative to the electrode between a first position in which the motor shaft is parallel to the axis of the electrode and a second position in which the motor shaft is at right angles to the axis of the electrode.

For a more complete understanding of the invention and the objects and advantages thereof which will become apparent hereinafter, reference should be had to the accompanying drawings and the following detail ed description wherein a preferred embodiment of the invention is illustrated and described.

DESCRIPTION OF THE DRAWINGS

In the drawings:

FIG. 1 is an exploded, perspective view of a welding rod holder equipped with the orbiting mechanism of the present invention;

FIG. 2 is a side elevational view of the holder and orbiting mechanism;

FIG. 3 is a fragmentary rear elevational view of the holder and orbiting mechanism; and FIG. 4 is a fragmentary cross sectional view of the hand grip portion of the holder showing one arrangement of housing the batteries and control switch for the orbiting mechanism.

DESCRIPTION OF THE PREFERRED EMBODIMENT

With the exception of the orbiting mechanism, the welding electrode holder is of conventional construction and includes a cylindrical hand grip 10 of electrical insulating material , an electrode clamp consisting of a fixed metallic plate 12 with one or more grooves 14 for receiving an end of a welding rod 16 and a spring-loaded clamping plate 18, a finger-operated release button 20 for the clamping plate 18, and an insulated cable for connecting the electrode clamp to one side of the welding power supply.

The welding rod orbiting or oscillating mechanism of the present invention includes an electric motor 24, preferably a fractional horsepower, 5 volt D.C. motor. Motors of "postage stamp" size such as are used in various hobby applications are suitable. An eccentric weight 26 is attached to and rotates with the motor shaft 28. A sealed housing 30 encloses the motor and eccentric weight. Attached to and projecting from one side of the housing is a connector plate 32 which abuts the rear or outer face of the fixed rod clamping plate 12. A bolt having a head 34 and a threaded shank 36 and a wing nut 38 are employed to attach the connector plate to the clamping plate, the clamping plate having a through opening with a first portion 40 which non-rotatably receives the bolt head and a second portion 42 through which the bolt shank extends, the connector pl ate having a through opening 44 through which the shank al so passes. As is shown in FIG. 3, this mounting arrangement allows the motor unit to be selectively mounted in either a first position in which the axis of rotation of the motor is parallel to the axis of the welding rod and a second position, shown in phantom outline, in which the axis of rotation is perpendicular to the welding rod axis.

A power supply and control arrangement for the motor 24 is illustrated in FIG. 4. In this arrangement, an insulated casing 46 is located within the hand grip portion 10 of the electrode holder for reception of two dry cell batteries 48. The batteries are in series between a first terminal 50 connected to one lead 52 and a second terminal 54 connected, through an on/off switch 56, to a second lead 58, the leads extending to the motor 24. It will be apparent that other arrangements may be employed. For example, when used with an electrode holder lacking sufficient space in which to house the batteries internally, a separate battery casing may be used and attached to the exteriors of the electrode holder by a strap or other suitable means.

When the motor is energized, the oscillating motion resulting from rotation of the eccentric weight is coupled, through the connector plate and the electrode clamp, to the welding rod. I have found that the resultant oscillating motion of the welding electrode tip produces welds of improved quality. When the motor unit is in the first position, that is, with the motor axis parallel to the welding rod axis, the tip moves in a small amplitude orbiting manner of, for example, 1200 orbits per minute. Such motion results in a stirring of the molten weld metal thus creating a stronger weld and permits faster welding in situations in which fast cooling and crusting of the puddle are involved. In the second position of the motor unit, with the motor axis perpendicular to the axis of the welding rod, the rod tip moves in a small amplitude oscillating motion along the axis of the rod. This motion serves to prevent or lassen sticking of the rod to the workpiece and to reduce burn-through when welding thin metals. The rod tip motion, with either orientation of the motor unit, also aids in arc striking and permits the use of lower amperage welding currents.

It will be understood that, while a preferred embodiment of the invention has been illustrated and described in detail herein, changes and additions may be had therein and thereto without departing from the spirit of the invention. Reference should, accordingly, be had to the appended claims in determining the true scope of the invention.

I claim:

1. In combination with a hand held welding electrode holder of the type having a hand grip and an electrode clamp at one end of the hand grip, a mechanism for imparting orbital oscillating motion to a welding electrode comprising:

a fractional horsepower, low voltage electric motor having an output shaft;

an eccentric weight connected to and rotating with said output shaft;

a sealed housing enclosing said motor and said eccentric weight;

means for securing said housing to the electrode clamp to transmit the oscillating motion generated by rotation of said eccentric weight to the clamp and an electrode clamped therein; and power supply and control means for said motor.

2. The combination according to claim 1 wherein said means for securing is adjustable to retain said motor in either a first position in which the axis of said output shaft is parallel to the axis of the electrode or a second position in which the axis of said output shaft is perpendicular to the axis of the electrode.

3. The combination according to claim 2 further including a connector plate affixed to said housing, said means for securing connecting said plate to the electrode clamp.

4. The combination according to claim 1 wherein said power supply and control means includes a battery and an on/off switch.

5. The device according to claim 4 wherein said battery is housed within the hand grip of the holder.

* * * * *